(12) United States Patent
Doggwiler et al.

(10) Patent No.: US 6,432,567 B1
(45) Date of Patent: Aug. 13, 2002

(54) FUEL CELL BATTERY WITH AFTERBURNING AT THE PERIPHERY OF A CELL STACK

(75) Inventors: Bruno Doggwiler, Hallau; Martin Keller, Winterthur, both of (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/491,048

(22) Filed: Jan. 25, 2000

(30) Foreign Application Priority Data

Mar. 17, 1999 (EP) .............................................. 99810235

(51) Int. Cl.⁷ .......................... H01M 8/02; H01M 8/04; H01M 2/00
(52) U.S. Cl. .............................. 429/19; 429/17; 429/34; 429/38; 429/39
(58) Field of Search .............................. 429/17, 19, 26, 429/34, 45, 38, 39

(56) References Cited

U.S. PATENT DOCUMENTS 3,718,506 A * 2/1973 Fischer et al.
5,338,621 A * 8/1994 Bossel ........................ 429/18
5,902,692 A * 5/1999 Batawi ....................... 429/26
5,998,053 A * 12/1999 Diethelm ..................... 429/14

FOREIGN PATENT DOCUMENTS

| EP | 0355420 A1 | 2/1990 |
| EP | 0450336 A2 | 10/1991 |
| EP | 0780917 A1 | 6/1997 |
| WO | WO 98/22991 | 5/1998 |

* cited by examiner

*Primary Examiner*—Carol Chaney
*Assistant Examiner*—Tracy Dove
(74) *Attorney, Agent, or Firm*—Townsend and Townsend and Crew LLP

(57) ABSTRACT

A fuel cell battery is operated with an afterburning at the periphery of a cell stack. Each cell of the battery has at least one entry point for air or another gas containing oxygen. The afterburning is provided inside a ring-shaped space about the cell stack. The named entry points are communicatingly connected as a totality or in each case group-wise via at least one air space, which extends axially along the cell stack and which stands in direct contact with the latter. Each air space is separated from an afterburner chamber, which likewise forms a space which communicates axially along the cell stack, by at least one wall.

9 Claims, 2 Drawing Sheets

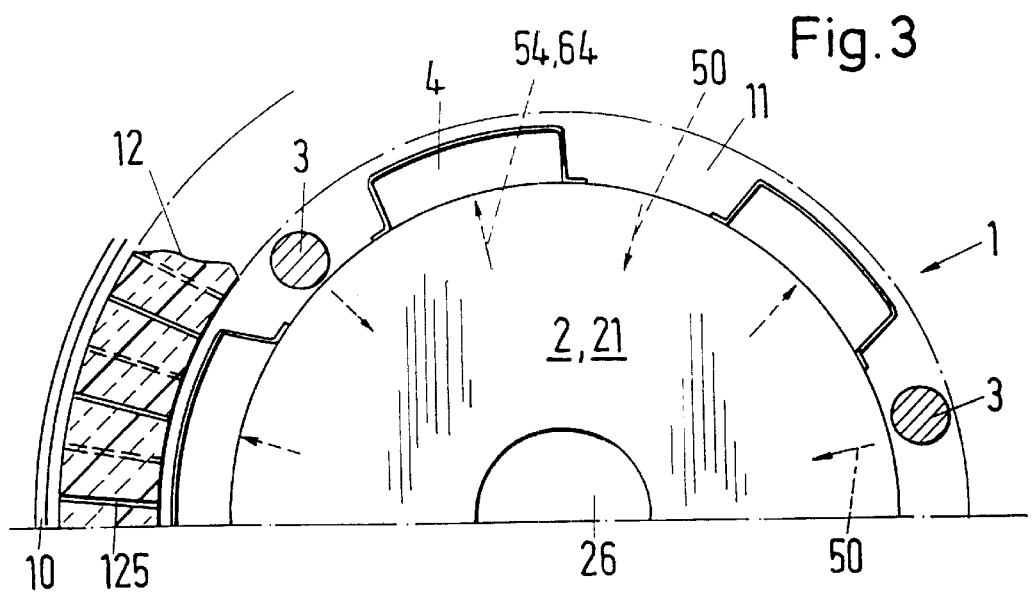
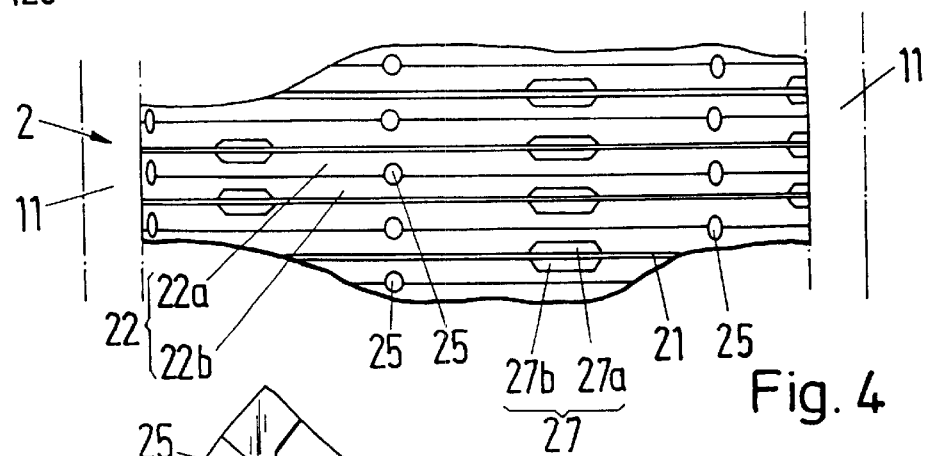
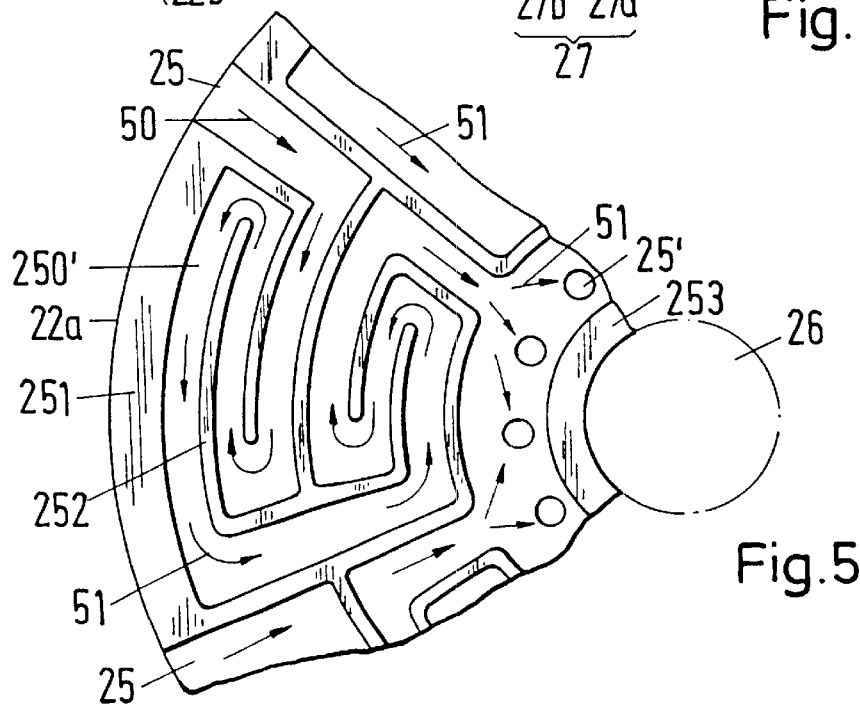

FUEL CELL BATTERY WITH AFTERBURNING AT THE PERIPHERY OF A CELL STACK

BACKGROUND OF THE INVENTION

1. Field of the Invention

The present invention relates to a fuel cell battery with afterburning at the periphery of a cell stack.

2. Description of the Prior Art

An apparatus with high temperature fuel cells is known from EP-A 0 580 918 which comprises a centrally symmetric cell stack and a heat insulating envelope. An afterburner chamber lies between the cell stack and the envelope. Air infeed lines for the fuel cells which traverse the afterburner chamber at a large number of locations are arranged at the periphery of the stack.

Each fuel cell comprises two parts, namely a disc-shaped interconnector and a so-called PEN (derived from: Positive electrode/solid Electrolyte/Negative electrode). The PEN is an electrochemically active element which is arranged in the form of a thin solid electrolyte plate with two electrode layers between interconnectors. The interconnector produces electrical connections between the PEN electrodes of adjacent cells. It contains a passage system for gaseous fluids, via which on the one hand a fuel gas is transported from a central entry point along the PEN to the periphery of the cell stack and on the other hand air or a gas containing oxygen is transported from the air spaces to the center—for the purpose of a further heating up of the air—and from there back along the PEN to the periphery.

SUMMARY OF THE INVENTION

The air infeed lines to the cells cause high costs as a result of their large number. The object of the invention is to create a fuel cell battery which is more economical with respect to the air infeed into the fuel cells.

The fuel cell battery is operated with an afterburning at the periphery of a cell stack. Each cell of the battery has at least one entry point for air or another gas containing oxygen. The afterburning is provided inside a ring-shaped space about the cell stack. The named entry points are communicatingly connected as a totality or in each case group-wise via at least one air space. The air space extends axially along the cell stack and stands in direct contact with the cell stack. Each air space is separated from an afterburner chamber, which likewise forms a space which communicates axially along the cell stack, by at least one wall.

In one embodiment the interconnectors are formed in two layers. Each layer of the interconnector consists of a shaped and coated basic body which has a temperature expansion behavior which is at least approximately similar to that of the PEN and which is largely sintered from a metallic powder into the form of a finished part. Two layers of this kind are for example assembled to a unit through soldering. The passages of the interconnectors, on both sides of which in each case a PEN covers over the passages which are open there, have for example a spiral shape, and indeed in such a manner that during the operation of the battery the PEN electrodes are largely uniformly brushed over by the gaseous fluids (fuel gas and air or gas containing oxygen).

The interconnectors and PENs are stacked up as single parts—forming an alternating sequence—to a stack. This cell stack is pressed together by means of tensioning means, for example draw bars, in the direction of the stack axis. Discretely arranged openings for the entry or departure respectively of the gaseous fluid are located at the periphery of the cell stack. The positions of these openings are determined by the design of the passages and the conducting in and out of the fluid which is provided in accordance with the invention. The openings can be correspondingly pre-shaped in the sintered interconnector layers. The manufacture of the interconnectors 22 by means of sintering enables a very high dimensional precision. Contacts which are sufficiently impervious with respect to a radial passage of air or gas respectively are therefore possible at the joint locations between the interconnectors 22 and the PEN plates in the cell stack 2.

As already in the known battery of EP-A 0 580 918, the envelope can be designed as a heat insulating system so that the envelope takes over the role of an external recuperator in addition to its heat insulating function: instead of the air required for the electrochemical processes in the cells being pre-heated in a separate external recuperator, the air is used as a heat sink in that the heat which flows away out of the cell stack is at least partly captured in the envelope and conducted back to the reaction location.

The known envelope is designed in a plurality of layers; it has a passage system for the air flow. Between the outer wall, which forms a first layer of the envelope, and the inner parts of the envelope there lies a first cavity in which a cooling of the envelope by the air takes place. In the passage system, which adjoins at the first cavity, there results a further heating of the air. Instead of or in addition to the passages, porous, air-permeable parts can also be built in in the envelope.

BRIEF DESCRIPTION OF THE DRAWINGS

FIG. 3 is a cross-section through the battery, FIG. 4 illustrates a fragment of a cell stack of the fuel cell battery in accordance with the invention, and FIG. 5 illustrates a meander-shaped passage system for an interconnector.

DETAILED DESCRIPTION OF SPECIFIC EXEMPLARY EMBODIMENTS

Figure 1:
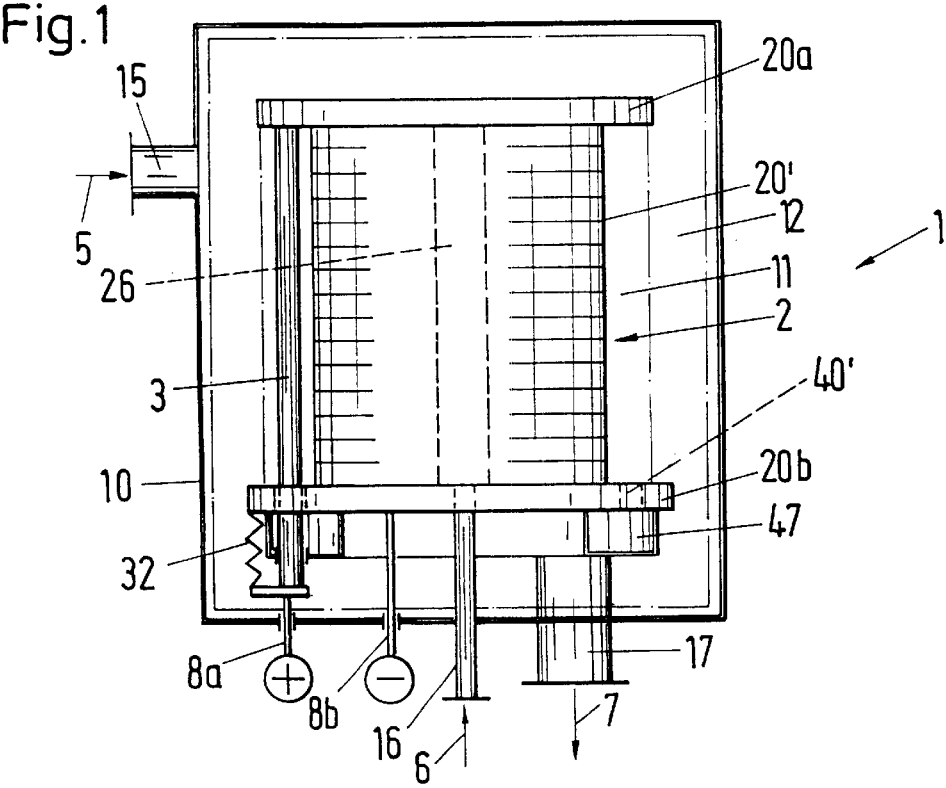
FIG. 1 illustrates a fuel cell battery with a centrally symmetric cell stack.

The fuel cell battery 1 illustrated in FIG. 1 comprises the following components: a cell stack 2 between a cover plate 20*a* and a base plate 20*b* which are designed as electrical poles of the battery 1; a ring-shaped space 11 at the periphery 20' of the cell stack 2, within which an afterburning is provided; a heat insulating envelope 12, of which only the outlines are drawn in chain-dotted lines; an outer wall 10 of the battery 1 with a connector stub 15 for the infeed of air 5 or of a gas containing oxygen 5; an infeed line 16 for a fluid fuel 6, which is gaseously distributed onto the individual cells along a central passage 26—where appropriate after a vaporization and/or reforming; a ring-shaped common passage 47 for an exhaust gas 7 which can be drawn off via a connector stub 17 out of the battery 1; furthermore, bars 3 (only one visible here) and draw springs 32, by means of which the two plates 20*a* and 20*b* can be drawn towards one another. Chambers 4 (see FIGS. 2 and 4) for the afterburning which are arranged in the ring space 11 but are not illustrated in FIG. 1 are in connection with the common passage 47 above apertures 40' in the base plate 20*b*. The electrical current which is produced in the battery can be taken out via connectors 8a and 8b, with the bar 3 also being used as an electrical connection to the cover plate 20a in addition to its function as a tensioning means.

Figure 2:
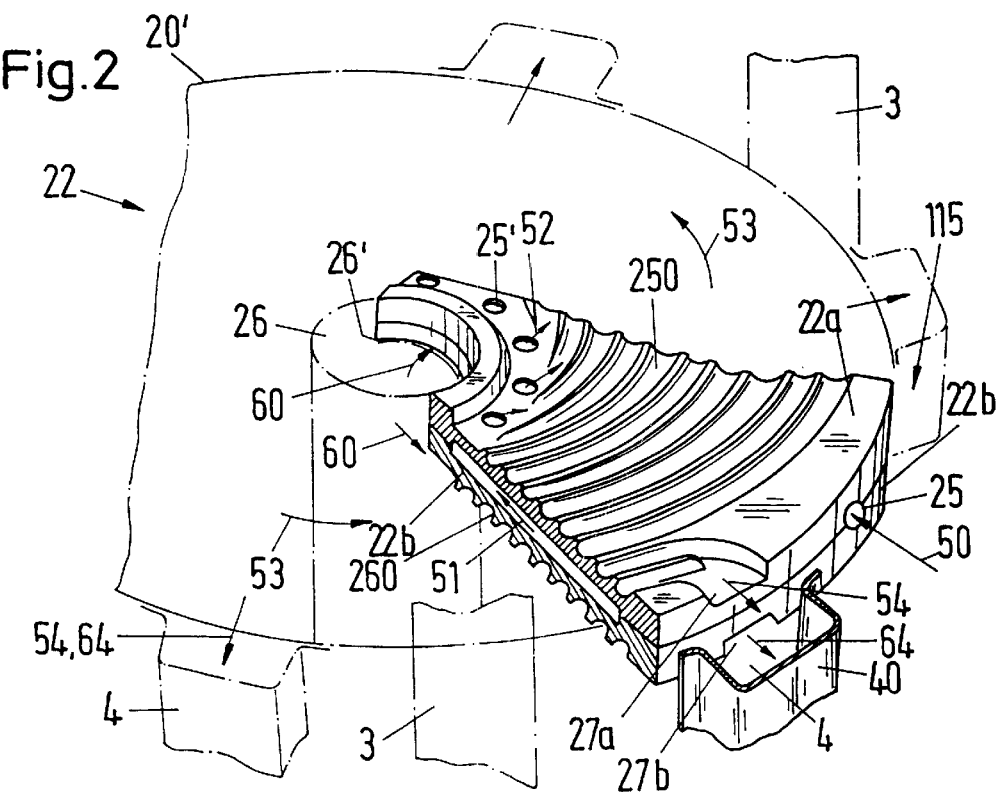
FIG. 2 illustrates a fragment of an interconnector of the fuel cell battery in accordance with the invention.

Each cell comprises a disc-shaped interconnector 22—see FIG. 2—and a PEN 21 (see FIG. 4) which is an electrochemically active element in the form of a thin plate and consists of a solid electrolyte and two electrodes which are applied through coating. The interconnector 22 is assembled from two layers 22a and 22b. It contains a passage system 250, 260, via which on the one hand fuel gas 60 is transported from a central entry point 26' along the PEN to the periphery 20'—arrows 60 and 64—and on the other hand air 50 (or gas containing oxygen) is transported from the air spaces 115 at the periphery 20' to the center 26, through holes 25' there and then back again along the PEN 21 to the periphery 20': arrows 51, 52, 53 and 54. At the periphery 20' of the cell stack 2 are located discretely arranged entry openings 25 for the air 50 and outlet openings 27a, 27b for the gases 54 and 64 used in electrode reactions.

The cover plate 20a and the base plate 20b are current collector plates. Electrode plates, namely a cathode or an anode plate respectively, which in each case form a closure of the cell stack, are advantageously laid in between the uppermost or the lowermost PEN 21 respectively and the corresponding current collector plate 20a, 20b. The contact surfaces between the current collector plates and the electrode plates are provided with coatings which protect against oxidation, which ensure a long enduring electrical conductivity and which enable a releasable connection of the current collector plates 20a, 20b. A Perowskite (LSM) which can be thermally sprayed on can be used for the coating.

The gas or air passages 260, 250 respectively of the interconnector 22, at both ends of which a PEN 21 forms a covering, have a spiral shape so that during the operation of the battery 1 the PEN electrodes are largely brushed over uniformly by the gas 60 or the air 53 respectively.

Each layer 22a, 22b of the interconnector 22 consists of a sintered and coated basic body which has at least approximately the same thermal expansion behavior as the PEN (cf. European patent application No. 98810125.9). Two layers 22a and 22b of this kind are assembled to form an interconnector. The interconnectors are shaped in such a manner that the openings 25, 27a and 27b for the entry or the departure respectively of the gases result at suitable positions—namely in accordance with the invention: The air entry points 25 are communicatingly connected group-wise via at least one air space 115, which extends axially along the cell stack 2 and which is in direct contact with the latter. In this each air space 115 is separated by walls 40 from afterburner chambers 4, which likewise form spaces which communicate axially along the cell stack. As a result no individual air infeed lines are required by means of which a connected ring-shaped afterburner chamber is to be traversed. Thus the costs for such individual air lines are eliminated.

In the cross-section of FIG. 3 through the battery 1 in accordance with the invention a heat insulating system which surrounds the ring-shaped space 11 is shown as a fragment. It comprises an outer wall 10—in the illustrated example a double wall, which can contain a vacuum—as well as a layer 12 of a heat insulating material in which radial passages 125 for an air passage are arranged. The layer 12 can also consist of a porous, uniformly airpermeable material so that the passages 125 can be omitted. In FIG. 3 also a PEN 21 of the cell stack 2 with the central gas distribution passage 26, afterburner chambers 4 and tensioning bars 3 which are arranged between the latter can be recognized. The infeed of fresh, preheated air 50 and the departure of air 54 and gas 64 after their utilization in the current supplying electrode reactions are indicated by broken arrows.

A side view of the cell stack 2 which is illustrated as fragment shows the openings 25 for the air infeed which are arranged in vertical groups and the openings 27a and 27b for the output of air or gas respectively. The openings 25 are located in each case at the boundary between the two layers 22a and 22b of the interconnectors 22. The openings 27a and 27b are in each case arranged at the two sides of a PEN 21 so that they form double openings 27. The outer boundary of the ring-shaped space 11 is indicated in chain-dotted lines.

In the interconnector 22 of FIG. 2 the passages 250 and 260 respectively which border on the PEN plates are spiral-shaped. The cavity for the air 51, which flows inwardly from the openings 25 to the passage holes 25', can also contain a passage structure, for example in meander shape, as is shown in FIG. 5. The air 50, 51 is conducted through passages 250' between ribs 252. An outer edge 251, the ribs 252 and an edge 253 at the central gas passage 26 form surfaces which lie in a common plane. The one layer 22a can be fitted together with its partner layer 22b through soldering at the edges 251 and 253. For the outer passages 250 and 260 a meander shape can likewise be provided.

The passage system in the interconnectors can also be designed in such a manner that the air 50 is fed into the cell stack 2 only via a vertical group of openings 25. Corresponding remarks hold for the double openings 27 for air and gas departures into the afterburner chamber 4. In these cases only one afterburner chamber is required.

What is claimed is:

1. A fuel cell stack with afterburning at a periphery of the stack, in the stack each cell including at least one entry point for air or another gas including oxygen, wherein the afterburning is provided inside a ring-shaped space about the fuel cell stack, wherein each entry point is connected as a totality via at least one air space that extends axially along the fuel cell stack, wherein each entry point is connected such that they are in communication, wherein the at least one air space stands in direct contact with the fuel cell stack, wherein each air space is separated from an afterburner chamber, wherein the afterburner chamber forms a space that communicates axially along the fuel cell stack by at least one wall, wherein the air or the gas containing oxygen is fed into the fuel cell stack via the ring-shaped space about the fuel cell stack, and wherein a plurality of passage-shaped afterburner chambers subdivides the ring-shaped space into substantially equally wide air spaces.

2. The fuel cell stack in accordance with claim 1 wherein each fuel cell comprises two parts including a disc-shaped interconnector and a PEN comprising an electrochemically active element in the form of a thin plate of a solid electrolyte and two electrodes that are applied through coating, wherein the interconnector is built up in two layers and includes a passage system via which a fuel gas may be transported from a central entry point along the PEN to the periphery and the air or the gas containing oxygen may be transported from the air spaces to the center and from there along the PEN back to the periphery, with discretely arranged openings being formed at the periphery of the cell stack for the entry and departure of the gases, respectively, through the interconnectors.

3. The fuel cell stack in accordance with claim 2 wherein the interconnector has a PEN on both sides that covers over the passages that are open, wherein the passages respectively of the interconnector have a spiral or meander shape such that during the operation of the fuel cell stack the PEN electrodes are substantially uniformly brushed over by the fuel gases and the air or another gas including oxygen, respectively.

4. The fuel cell stack in accordance with claim 2 wherein each layer of the interconnector consists of a shaped, coated basic body that has a temperature expansion behavior that is at least approximately similar to that of the PEN, wherein the body is substantially sintered from a metallic powder into the form of a finished part; and wherein two layers are assembled to form the interconnector.

5. The fuel cell stack in accordance with claim 4 wherein the interconnectors and PENs are stacked up as individual parts in an alternating arrangement to form the fuel cell stack; and wherein the fuel cell stack is pressed together in an axial direction through tensioning means.

6. The fuel cell stack in accordance with claim 1 wherein the fuel cell stack is tensioned together by axial bars that are arranged in at least some of the air spaces.

7. The fuel cell stack in accordance with claim 6 wherein at least one of the axial bars is designed as a current conductor for d.c. electrical energy that is generated in the fuel cell stack.

8. The fuel cell stack in accordance with claim 1, wherein the fuel cells are circular and the fuel gas may be distributed to the individual fuel cells via a passage that is formed by central apertures of the fuel cells.

9. The fuel cell stack in accordance with claim 1 wherein between an outer wall of the fuel cell stack and a ring-shaped space about the fuel cell stack a heat insulating system is arranged into which passages for the air are integrated and in which porous, air-permeable parts are contained in such a manner that during the operation of the fuel cell stack the air flowing inwardly through the heat insulating system enables a backward transporting of heat to the fuel cell stack through the absorption of heat, and wherein for air that flows through the heat insulating system a uniform distribution to the individual air spaces at the periphery results.

* * * * *